United States Patent [19]

Novak et al.

[11] Patent Number: 5,722,670
[45] Date of Patent: Mar. 3, 1998

[54] SEALING ASSEMBLY AND MULTI-LAYER GASKET FOR RESISTING FACING DELAMINATION AND DEGRADATION

[75] Inventors: Gary J. Novak, Indian Head Park; Donald A. Bajner, Elmwood Park, both of Ill.

[73] Assignee: Fel-Pro Incorporated, Skokie, Ill.

[21] Appl. No.: 708,189

[22] Filed: Sep. 6, 1996

[51] Int. Cl.$^6$ ............................................. F16J 15/12
[52] U.S. Cl. .................... 277/235 A; 277/233; 277/235 B
[58] Field of Search .......................... 277/235 B, 233, 277/235 A, 235 R, 227

[56] References Cited

U.S. PATENT DOCUMENTS

| | | | |
|---|---|---|---|
| 3,924,863 | 12/1975 | Nakano et al. | 277/235 B |
| 4,776,602 | 10/1988 | Gallo | 277/235 B |
| 4,956,226 | 9/1990 | Ashizawa et al. | 277/235 B |
| 5,105,777 | 4/1992 | Kronich et al. | 277/235 B |
| 5,362,074 | 11/1994 | Gallo et al. | 277/235 B |

*Primary Examiner*—Daniel G. DePumpo
*Attorney, Agent, or Firm*—Steven P. Shurtz; Brinks Hofer Gilson & Lione

[57] ABSTRACT

A head gasket for sealing the head and block of an internal combustion engine includes a pair of metal cores of different coefficients of expansion, each with a facing, which gasket, in use, reduces shear forces tending to delaminate or destroy the facings.

26 Claims, 1 Drawing Sheet

SEALING ASSEMBLY AND MULTI-LAYER GASKET FOR RESISTING FACING DELAMINATION AND DEGRADATION

BACKGROUND OF THE INVENTION

Among typical gaskets used for sealing the confronting heads and blocks of automotive engines are those having a metallic core with facings, such as graphite, elastomer or fiber/elastomer facings, on each face. The facings confront the head and block respectively, provide for sealing thereagainst, and are subjected to the forces imposed on the gasket by the confronting head and block surfaces, including shear forces, etc.

In the past, most engines employed heads and blocks of the same material. As such, any shear forces imposed on the gasket due to thermal expansion tended to be relatively uniformly applied, both by the head and block which expanded at substantially the same rates. However, at present the head and block of a given engine are frequently made of different materials, such as of cast iron and aluminum. These impose forces on the interposed gasket which are different due to differences in the coefficients of expansion. As the flanges to be sealed heat up, they "grow" at different rates and create shear forces which act differentially against the surfaces of the interposed sealing means. These forces tend to act to delaminate and otherwise degrade or destroy typical gaskets having a central metallic core and facings on each surface. It would be desirable to provide an improved gasket constructed to alleviate this and other related problems.

SUMMARY OF THE INVENTION

In accordance with the present invention, a gasket for disposition between a pair of metal flanges to be sealed, and wherein the metal flanges have substantially different coefficients of expansion, is provided. The gasket comprises a first metal core having a first coefficient of expansion, a facing laminated to a first surface of the first metal core, a second metal core of a metal different from the first metal core and having a second coefficient of expansion different from the first coefficient of expansion, a facing laminated to a first surface of the second metal core, and means securing the first and second cores to each other to form a sandwich, with the first and second facings facing outwardly from opposite sides of the sandwich.

The securing means may comprise a grommet means and sealing means may also be disposed between the metal cores. The first and second metal cores may be of ferrous metal and aluminum, respectively. At least one of the facings may be an expanded graphite facing and at least one of the cores may be a tanged metal core.

In a preferred form, the flanges may be the flange surfaces of the head and block of an internal combustion engine and the grommet means may be an armor around the combustion openings.

Further objects, features and advantages of the invention will become apparent from the following description and drawings.

DETAILED DESCRIPTION

Figure 1:
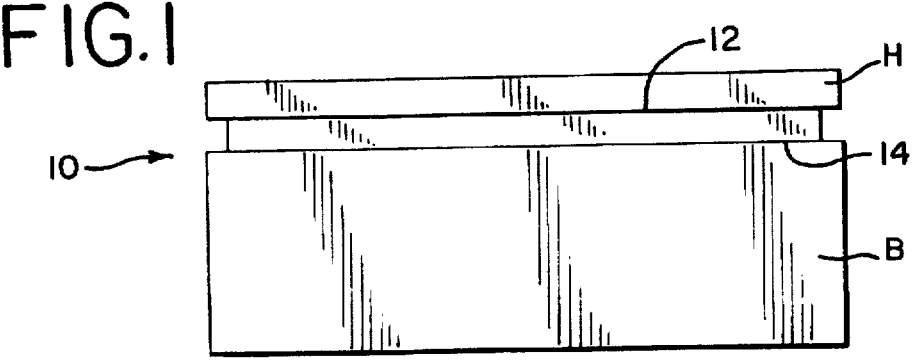
FIG. 1 is a schematic side elevational view of an internal combustion engine employing a gasket of the present invention.
Figure 2:
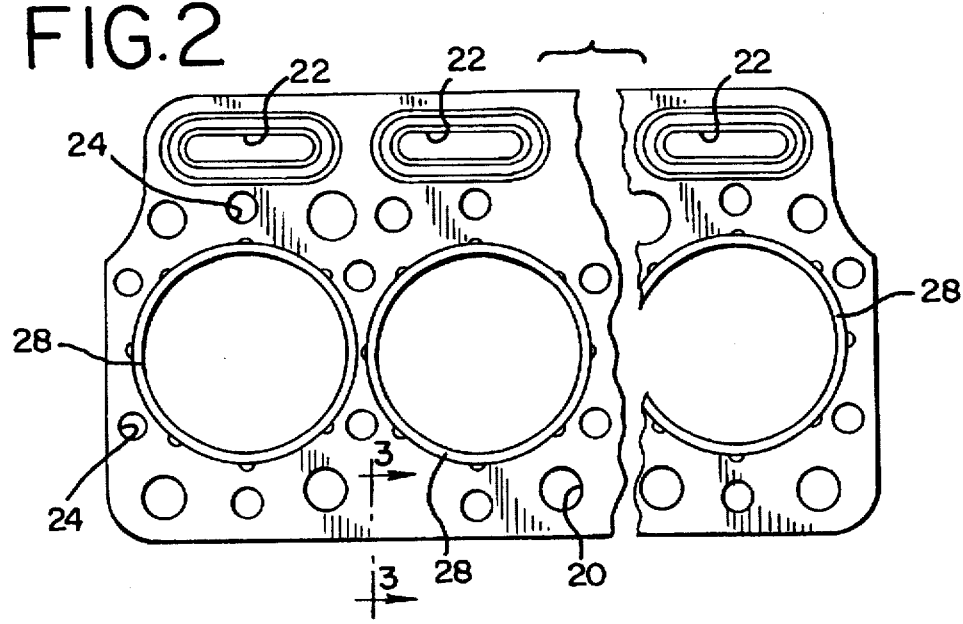
FIG. 2 is a plan view of a gasket of the present invention.
Figure 3:
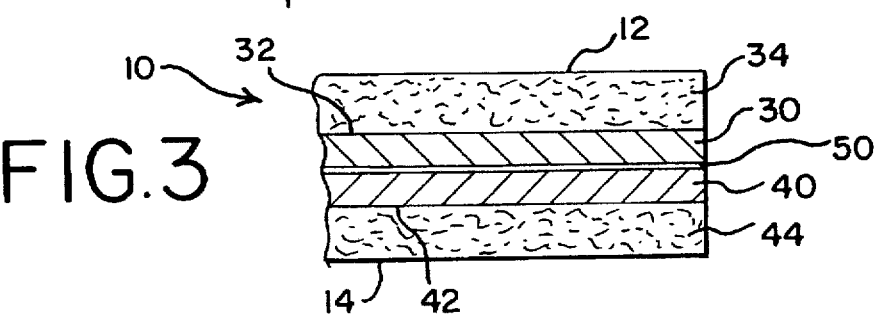
FIG. 3 is a cross-sectional view of the gasket of FIG. 2 taken along 3—3 of FIG. 2.

Referring now to FIGS. 1 to 3, a gasket 10 in accordance with the present invention may have a conventional appearance and configuration in plan view. Gasket 10 is adapted to be positioned between a pair of metal flanges to be sealed, such as the head H and block B of an internal combustion engine, and to be compressed therebetween to seal appropriately. The head and block may be aluminum and a ferrous metal such as cast iron, respectively, and may include combustion cylinders, sleeves, pistons, oil and coolant passageways, bolt holes, etc., all of which are conventional, and in a configuration for which the basic configuration of the gasket 10 has been designed.

Gasket 10 comprises a gasket body defining two oppositely facing main surfaces 12 and 14. The gasket body further defines a plurality of suitably positioned openings, which include service or combustion openings 18, oil and coolant fluid passage openings 20 and 22, and bolt holes 24.

The gasket body includes a plurality of layers. As best illustrated in FIG. 3, the gasket body includes a first metal layer or core 30 such as of aluminum and a facing layer 34 on or laminated to the outermost surface 32 of core 30, and a second metal layer or core 40, such as of a ferrous metal such as steel and a facing layer 44 on or laminated to the outermost surface 42 of core 40. The innermost surfaces 36, 46 of cores 30, 40 are joined, as by a sealant material 50 which may have adhesive qualities as well.

Layers 30, 34 are laminated mechanically or adhesively, as by a suitable adhesive. Suitable heat-activatable adhesives include phenolic-nitrile rubber and polybutyral rubber which are desirably initially applied to the facing layer surface. Facing layer 34 may incorporate glass fibers, cellulosic fibers, or other suitable fibrous material and may utilize rubber or rubber-like materials, such as nitrile, neoprene, or polyacrylic elastomers as binders. Facing layers 34, 44 generally resist degradation by oils and coolants, retain torque, minimize extrusion, and exhibit heat resistance.

Layers 40, 44 may be laminated, adhered and structured in the same manner described respecting layers 30, 34.

Preferably the inner surfaces of cores 30, 40 are provided with a separating layer or sealing means such as a sealant material which may have some adhesive qualities as well. The sealant material should be chosen to prevent galvanic corrosion between the metal layers and to facilitate the necessary movement at the interfaces of the cores. Cores 30, 40 may also be mechanically joined via a grommet means, such as a conventional armor 28. The sealant or separating layer 50 may be an adhesive, rubber, epoxy, Teflon, metal or other material selected depending upon the particular environment. A preferred interface between the cores employs a dry graphite layer sprayed on one or both of the confronting surfaces. This decreases friction at the interface and accomodates shear motion thereat.

In accordance with a preferred form of this invention, the metal cores 30, 40 are of different metals such as aluminum and carbon steel, with core 30 being aluminum and core 40 being steel. These are selected to correspond generally to the materials of the head and block and will tend to expand and contract at generally the same rates, thus substantially reducing or essentially eliminating relative movement between the associated facing and the flange of the confronting head or block against which the facing seals. Other combinations, such as plastic/aluminum, stainless/carbon steel, aluminum/ magnesium, may be used. The combinations preferably are keyed to the differences in the coefficients of expansion of the flanges of the joint to be sealed.

In one form of the invention, both facing layers 34, 44 are of the same fiber/elastomer facings described, and the cores may be solid, with the facing layers being adhesively laminated to the cores 30, 40 respectively.

In other forms of the invention, one or both of the facing layers may be of compressed expanded graphite. The compressed expanded graphite facings comprise sheets of compressed expanded graphite which, after assembly with the cores 30, 40 are each about 0.025 inch thick and are each of a density of about 70 pounds per cubic foot. Other thicknesses and densities of graphite may be used as desired.

A suitable compressed flexible, expanded graphite material is available from Calcarbon, a division of Polycarbon, Inc. under the name of Calgraph A. A typical Calgraph A comprises a minimum of about 98% graphite and about 2% ash maximum at 950° C. (ASTM C-561) and has a density of about 70 pounds per cubic foot. The material is essentially devoid of binders, resins, fillers and adhesives. A like material is available from Union Carbide Corporation and is said to be made in accordance with U.S. Pat. No. 3,404,061. Such materials may be formed into sheets, and then die-cut into the desired shape and then further compressed, if desired. Thus 70 pound per cubic foot sheet material may be cut into suitable gasket shapes for assembly with the core later to be further compressed, if desired, or expanded graphite may be formed into the sheet pattern of the drawings and then laminated with the core.

Where desired, the facing layers 34, 44 may be different, such as one of expanded graphite and the other of a fiber/elastomer composite or elastomer.

Additionally, the cores may use different techniques for securing the facings. Thus, tanged cores may be used for securing the facings. Both tanged and solid cores are known for use with both types of facing layers so far described, as is shown by U.S. Pat. Nos. 4,705,278 and 4,662,643. Other types of core geometries may be employed as well.

Because the metal cores are different, and preferably are respectively the same as, or match the respective different coefficients of expansion of, the head and block, they expand and contract relative to the surfaces and contribute to sealing without imposing significant shear stresses on their associated facings. This serves to substantially diminish delamination and potential damage to the facings, and to diminish shear stresses imposed between each facing and its respective core at the adhesive interface between them. Of course relative motion between the facing and the surface to be sealed is also reduced for similar reasons.

The use of two different cores also provides a number of other advantages. For example, where a higher cost core material, such as aluminum would be indicated, because a pair of cores is used in accordance with the present invention, each core may be thinner and part of the overall core material may be a less expensive material such as steel. Where desired a third or more metal layers may be interposed between cores 30, 40 as separating layers to enhance the characteristics of the gasket. Their materials and coefficients of expansion may be selected to provide a graded transition between cores 30, 40, where desired, to minimize the effect of relative movement on them or their coatings.

Figure 4:
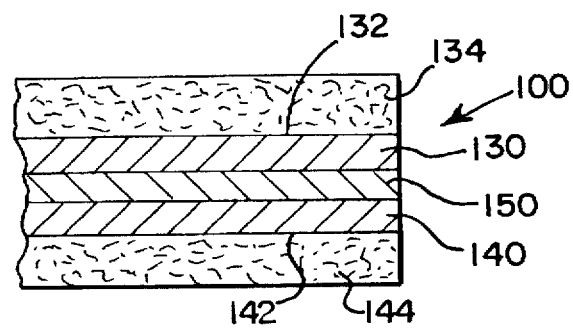
FIG. 4 is a cross-sectional view, like FIG. 3, of a further embodiment of the present invention.

Yet another form of the invention which also resists delamination due to shear forces being differentially applied at the opposite surfaces of single core gaskets is illustrated in FIG. 4. As there shown a gasket 100, which in plan view may be like the gasket of FIG. 2 and which is adapted to be positioned between a pair of metal flanges to be sealed, such as the head H and block B of an internal combustion engine as illustrated by FIG. 1, is seen to comprise a first metal layer or core 130 and a facing layer 134 formed on or laminated to the outermost surface 132 of core 130 and a second metal layer or core 140 and a facing layer formed on or laminated to the outermost surface 142 of core 140. The innermost surfaces 136, 140 of cores 130, 140 are maintained in close proximity as by armors as described above. The facing layers may be elastomers, fiber/elastomer or graphite layers, as described above.

In the embodiment of FIG. 4, a medium is provided which permits movement and micromotion at the interface of the core surfaces 130, 140. In that manner, shear forces applied to the surfaces of the facing layers by the confronting flanges are largely transferred to the innermost core interface where the forces are accommodated to by design, rather than to the interfaces of the flanges and facing layers or to the interfaces of the cores and the facing layers where those forces would act to delaminate or degrade the facing layers.

To that end, the interface of the cores 130, 140 in FIG. 4 is provided with one or more additional intermediate layers, such as a third metal layer 150. This will accommodate larger temperature differences or thermal expansion primarily at one side of the joint. In this embodiment, although the flanges are different and have different coefficients of expansion, the cores 130, 140 used may be the same. Thus, the cores 130, 140 may be sheets of aluminum, which are thin to minimize expense. The intermediate metal layer 150 may be a carbon steel sheet which is relatively thicker to provide structural strength.

It will be appreciated that the differential coefficients of expansion of the flanges will tend to cause the cores 130, 140 to move differentially with the flanges. This will not act to cause delamination of the facing layers because relative movement between the cores 130, 140 will be provided for by the intermediate layer 150. Although it is not essential, again it is preferable that separating layers be provided between core 130 and layer 150 and between core 140 and layer 150 to facilitate movement of those interfaces, as of the materials and for the reasons described above.

In each case, the forces of expansion applied to the gasket 100 between the flanges are transferred to the interface between the pair of cores rather than concentrating at the interfaces of the cores and facing layers or at the interfaces of the flanges and facing layers. This then limits damage to and delamination of the facing layers, and instead allows the forces to concentrate at an interface which cannot be damaged by the differential forces and micromotion accommodated thereat. Further, the use of multiple cores permits the optimization of cost by minimizing the amount of expensive material used, and by maximizing the amount of least expensive material used, such as the relatively low cost carbon steel layer. Although a sealing layer, such as a thin rubber coating may be applied between the cores, desirably, a lubricant or sealer is applied between the multiple cores to prevent galvanic corrosion between any dissimilar metal layers and to facilitate ease of relative movement at those interfaces.

From the foregoing, it will be observed that numerous modifications and variations can be effected without departing from the spirit and scope of the present invention. It will be appreciated that the present disclosure is intended as an exemplification of the invention, and is not intended to limit the invention to the specific embodiments illustrated and described. The disclosure is intended to cover all such modifications as fall within the scope of the claims.

What is claimed is:

1. A gasket for disposition between a pair of metal flanges to be sealed, said gasket defining a plurality of openings, and wherein the metal flanges have substantially different coefficients of expansion, comprising a first metal core having a first coefficient of expansion, a facing laminated to a first surface of said first metal core, a second metal core of a metal different from said first metal core and having a second coefficient of expansion but different from said first coefficient of expansion, a facing laminated to a first surface of said second metal core, and means securing said first and second cores to each other to form a sandwich, and facilitating relative sliding movement of said first core relative to said second core, with said first and second facings facing outwardly from opposite sides of said sandwich.

2. The gasket of claim 1, and further comprising a sealing means between said cores.

3. The gasket of claim 1, and further comprising an adhesive means between said cores.

4. The gasket of claim 1, and wherein said gasket is a head gasket defining at least one combustion opening, and said securing means comprises an armor in said combustion opening.

5. The gasket of claim 4, and wherein said first and second metal cores are aluminum and a ferrous metal, respectively.

6. The gasket of claim 1, and wherein at least one of said facings is an expanded graphite facing.

7. The gasket of claim 1, and wherein at least one of said facings is one of a fiber/elastomer facing and an elastomer facing.

8. The gasket of claim 1, and wherein at least one of said cores is a tanged metal core.

9. The gasket of claim 1, and further including sealing means between said metal cores, and wherein at least one of said facings is an expanded graphite facing.

10. The gasket of claim 1, and further including at least one third metal core between said first and second cores.

11. An internal combustion engine comprising a head, a block and a head gasket defining a plurality of openings disposed between said head and block, said head and block being of metals which have substantially different coefficients of expansion, said gasket comprising a first metal core having a first coefficient of expansion like that of the head, a facing laminated to a first surface of said first metal core, a second metal core of a metal different from said first metal core and having a second coefficient of expansion like that of the block, but different from said first coefficient of expansion, a facing laminated to a first surface of said second metal core, and means securing said first and second cores to each other to form a sandwich while allowing relative sliding movement of said first core relative to said second core, with said first and second facings facing outwardly from opposite sides of said sandwich and sealingly contacting said head and block respectively.

12. The engine of claim 11, and wherein said first and second metal cores, are aluminum and a ferrous metal respectively.

13. The engine of claim 11, and wherein at least one of said facings is an expanded graphite facing.

14. The engine of claim 11, and wherein at least one of said facings is one of a fiber/elastomer facing and an elastomer facing.

15. The engine of claim 11, and wherein at least one of said cores is a tanged metal core.

16. The engine of claim 11, and wherein a sealing means is disposed between said cores and wherein at least one of said facings is an expanded graphite facing.

17. A seal assembly including a pair of flanges to be sealed by a gasket, and a gasket disposed between said pair of flanges, said gasket defining a plurality of openings, and wherein said flanges have substantially different coefficients of expansion, comprising a first core, a facing laminated to a first surface of said first core, a second core, a facing laminated to a first surface of said second core, and means securing said first and second cores to each other to form a sandwich and facilitating relative sliding movement between confronting faces of said first and second cores, with said first and second facings facing outwardly from opposite sides of said sandwich.

18. The seal assembly of claim 17, and further comprising a sealing means between said cores.

19. The seal assembly of claim 17, and further comprising a lubricant between said cores.

20. The seal assembly of claim 17, and wherein at least one of said facings is an expanded graphite facing.

21. The seal assembly of claim 17, and wherein at least one of said facings is one of a fiber/elastomer facing and an elastomer facing.

22. The seal gasket of claim 17, and wherein at least one of said cores is a tanged metal core.

23. The seal assembly of claim 22, and wherein said first coefficient of expansion is like that of the first flange and the second coefficient of expansion is like that of the second flange.

24. The seal assembly of claim 17 and wherein said means securing said cores and facilitating relative movement includes at least one third core between said first and second cores.

25. The seal assembly of claim 24, and wherein said first, second and third cores are of metal.

26. The seal assembly of claim 25, and wherein said first and second cores are of metals having different coeeficients of expansion.

* * * * *